United States Patent [19]

Nilsson

[11] Patent Number: 4,944,903
[45] Date of Patent: Jul. 31, 1990

[54] METHOD FOR REGULATING THE WORKING AND THE OUTPUT OF PLASTIC MATERIAL IN EXTRUSION MOULDING

[76] Inventor: Bo Nilsson, Postbox 3139 K, Gräsö, S-740 71 Öregrund, Sweden

[21] Appl. No.: 235,884
[22] PCT Filed: Mar. 5, 1987
[86] PCT No.: PCT/SE87/00112
    § 371 Date: Aug. 17, 1988
    § 102(e) Date: Aug. 17, 1988
[87] PCT Pub. No.: WO87/05259
    PCT Pub. Date: Sep. 11, 1987

[30] Foreign Application Priority Data
    Jul. 3, 1986 [SE] Sweden .................. 8601075

[51] Int. Cl.⁵ .......................................... B29C 47/92
[52] U.S. Cl. .............................. 264/40.1; 264/40.3; 264/40.4; 264/40.6; 264/40.7; 264/169; 425/135; 425/140; 425/144; 425/149; 425/197
[58] Field of Search .......... 264/40.1, 40.3, 40.4, 264/40.6, 40.7, 169; 425/135, 140, 144, 149, 197

[56]         References Cited
         U.S. PATENT DOCUMENTS

| | | | |
|---|---|---|---|
| 3,357,049 | 12/1967 | Spindler | 425/149 X |
| 3,445,889 | 5/1969 | Barwell et al. | 425/149 |
| 3,860,220 | 1/1975 | Matsubayashi et al. | 264/40.7 X |
| 4,120,630 | 10/1978 | Laspisa et al. | 425/144 X |
| 4,171,193 | 10/1979 | Rahlfs | 425/140 X |
| 4,197,070 | 4/1980 | Koschmann | 425/135 |
| 4,209,476 | 6/1980 | Harris | 264/40.4 |
| 4,452,750 | 6/1984 | Handwerk et al. | 264/40.3 |
| 4,478,775 | 10/1984 | Endo et al. | 264/40.3 |
| 4,671,908 | 6/1987 | Gwinn et al. | 264/40.7 |
| 4,721,589 | 1/1988 | Harris | 264/40.1 |
| 4,804,505 | 2/1989 | Venzke | 264/40.1 |

FOREIGN PATENT DOCUMENTS

| | | | |
|---|---|---|---|
| 56-28841 | 3/1981 | Japan | 264/40.7 |
| 59-54538 | 3/1984 | Japan . | |
| 59-98829 | 6/1984 | Japan . | |
| 59-115824 | 7/1984 | Japan | 264/40.6 |
| 59-115825 | 7/1984 | Japan | 264/40.7 |
| 659399 | 6/1979 | U.S.S.R. . | |
| 802062 | 2/1981 | U.S.S.R. | 264/40.1 |
| 895699 | 1/1982 | U.S.S.R. | 264/40.1 |

Primary Examiner—Jeffery Thurlow
Assistant Examiner—Leo B. Tentoni
Attorney, Agent, or Firm—Witherspoon & Hargest

[57]            ABSTRACT

Method for controlling the processing and output feeding of plastic melt by extrusion, by means of an extrusion plant including a process unit (1) for processing the plastic material, a pump (3) for feeding the plastic melt to a die (4) or the like, and a screen pack assembly positioned between the process unit (1) and the pump (3). In the process unit (1) the melt is imparted a constant level of kinetics of extrusion, and the plastic melt pressure (P2) between the screen pack assembly (2) and the pump (3) is kept above a predetermined level. As a measure of the level of kinetics of extrusion, the pressure (P1) of the melt between the process unit (1) and the screen pack assembly (2), is used, preferably in combination with the melt pressure (P2) after the screen pack assembly (2).

20 Claims, 1 Drawing Sheet

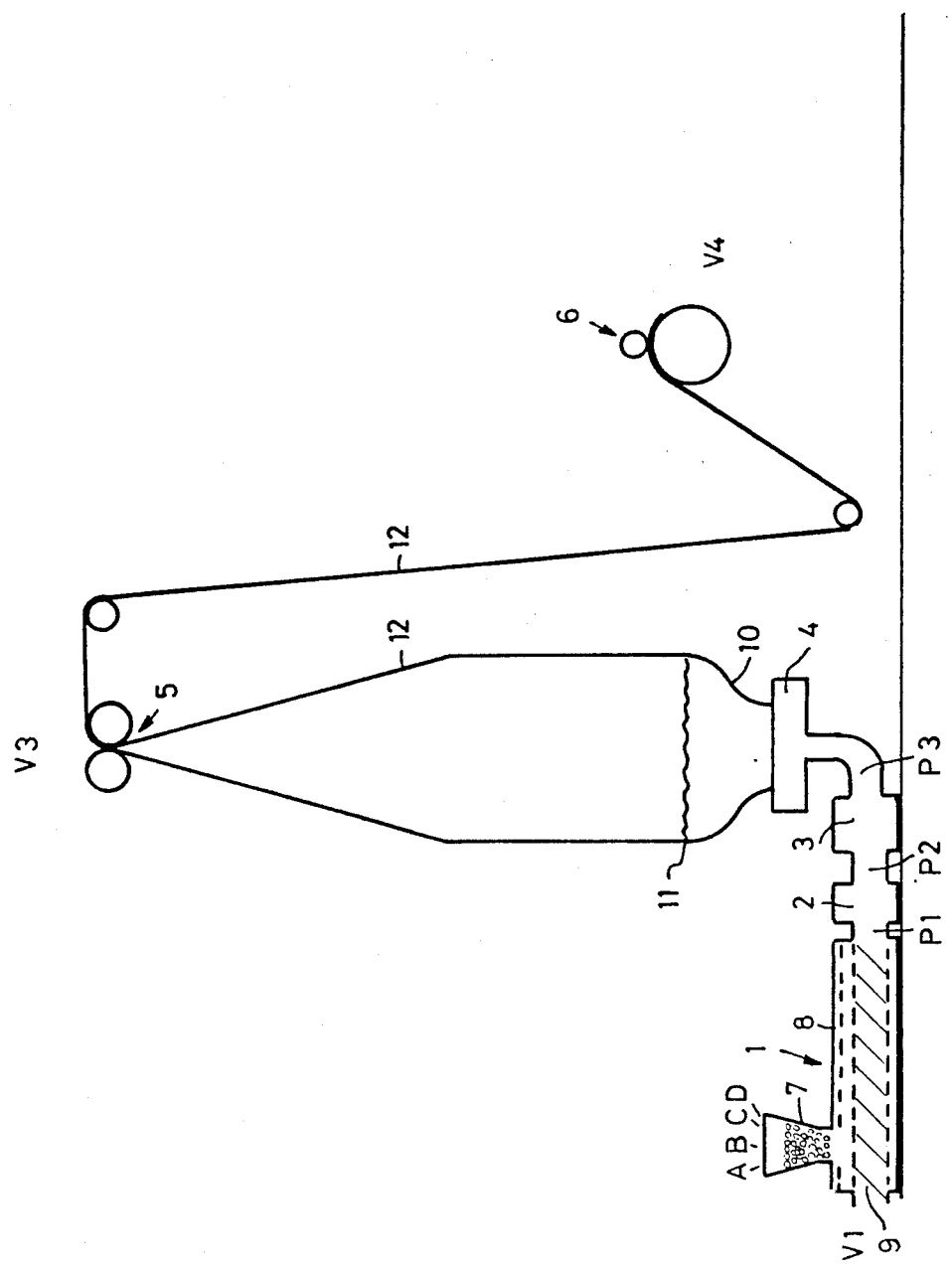

METHOD FOR REGULATING THE WORKING AND THE OUTPUT OF PLASTIC MATERIAL IN EXTRUSION MOULDING

BACKGROUND OF THE INVENTION

1. Field of the Invention

The present invention relates to the manufacturing of plastic articles, and preferably to those formed by extrusion, and in particular to an energy and raw material savinqs method, which renders a plastic product having a more even quality than is available today.

The invention is primarily intended to be used in conjunction with the forming of plastic articles by extrusion, such as blown film and foil, and in such a case, also in combination with other articles, such as plastic coated paper and cables. Persons skilled in the art of plastic extrusion do however realize that the invention is useful for many various types of extrusion processes. In the following, however, it will be described in conjunction with manufacturing of a plastic foil using film blowing technique, without limiting the inventive scope.

The invention permits a higher productive capacity with a lower specific energy consumption than is possible to achieve today, at the same time resulting in a final product with excellent dimension stability and constant mechanical and optical characteristics.

2. Description of the Prior Art

The conventional technique used today for manufacturing plastic articles, utilizes an extrusion machine or extruder. This machine is supplied with plastics in the form of granules or in another disintegrated form, possibly along with additives, such as UV-stabilizers, colour agents and similar. The feed stock is processed in the machine by means of a rotative screw, which also operates the outfeed of the plastic, to a viscous condition. The energy provided by the screw rotation melts the feed stock, but in so far as there is an additional wish to make the plastic more mobile, i.e. lower its viscosity, additional heat from special heating elements may in certain cases be supplied. From the extruder, the viscous plastic melt is fed, directly or via additional machines, to nozzles or dies for forming the actual plastic article.

The flights of the screw do not operate with an absolute seal against the surrounding cylinder wall, but a certain material return flow occurs between them. This improves the homogenisation and the raw material mixture of the molten material before it is fed into the nozzle or die by intermediary means of a screen pack assembly, which strains contaminants in the melt.

As long as the extruder screw is in a good condition, the machine usually operates with a relatively even throughput. There is, however, a wear and tear on the screw flights making the angular gap between them and the surrounding cylinder wall progressively bigger. The pressure drop in the screen pack assembly increases with the fineness of the sieve cloth and with the degree of its clogging, because of the impurities in the melt sticking to the sieve cloth. To be able to maintain an even melt throughput from the screen pack assembly, the pressure of the melt has to be increased before said screen pack assembly. This can only occur by increasing the number of screw revolutions, which in turn increases the return flow through said angular gap. The net outcome will then be the following:

A. The specific throughput through the extruder decreases.

B. The added specific mechanical energy results in an increased melt temperature before the screen pack assembly, with a resulting viscosity decrease of the melt, which further decreases the specific throughput due to increased return flow, and a further increase of the specific mechanical energy supply etc. until an equilibrium is reached.

C. The increased return flow implies in addition that the molecule chains of the polymers are subjected to an increased specific portion of shearing force resulting in a desintegration and shearing-off of the molecule chains. This leads to a drastic change of the polymer mechanical and optical characteristics after crystallization. A shearing-off of the molecule chains will also lower the viscosity further, which increases said return flow.

D. The increase of the melt temperature implies an increased cooling capacity, so that a constant frostline height is obtained, i.e. the line where crystallization occurs after or above the die. The position of the frostline is of importance from a quality view point with respect to both optical and mechanical properties of the formed plastic article. If the frostline height above the nozzle or die increases, which means insufficient cooling, the production rate has to be decreased. In other words, the frostline position is of importance for the production per time unit.

Keeping the mechanical energy supply per melt unit constant, the common technical term being "kinetics of extrusion", is therefore of a considerable significance for a final product with reproducible and constant mechanical and optical characteristics to be manufactured.

From what has been described above, it is evident that the level of kinetics of extrusion will be directly affected, if the production rate of a given production line is changed. This implies variations of utilized raw materials, as well as variations of machine equipment and its drive units, all of which effects the quality characteristics of the final product by varying the optimal level of kinetics of extrusion. Up to the present, an accurate control of the level of kinetics of extrusion has not been possible, and the processes have been run more on empirical experience and a desire for as high a production rate as possible. The level of kinetics of extrusion has varied much and has usually been too high to result in a high production rate with an acceptable production cost level.

With the increasing need to obtain higher production from each production unit, attempts have been made to lessen the need for a great pressure build-up after the extruder, either by designing dies with a lower pressure requirement or by supplementing the extruder with a special feed pump and in certain cases several of such pumps, for example one or several gear pumps. This pump provides the pressure build-up and an even and pulsation free outfeed to the die. This will in turn permit a greater production per time unit than the case is when such a pump is absent, and thus a higher production. The pump, however, does not solve the principle problem, which is to maintain a desired and constant level of kinetics of extrusion, independent of variations in the raw material, in the flowthrough of the screen pack assembly and/or in the production per time unit.

Summary Of The Invention

The above main problem is solved by the present invention at the same time as the following advantages are achieved:

A. The supplied specific energy amount becomes constant and corresponds exactly to the amount desired, which leads to considerable energy savings and renders a final product with the desired mechanical and optical qualities. By maximizing the mechanical properties, the same strength properties can be obtained in the final product using a smaller material thickness than before, due to the even quality thereof. Since the raw material cost often corresponds to 60–70% of the value of the final product, this will together with energy savings render considerable echonomical savings.

B. By decreasing the melt temperature and by keeping the output level constant, the cooling capacity requirement and frostline height will be maintained constant, which allows for a production capacity which substantially exceeds the one previously achieved.

The objective of the present invention is to eliminate the above problems and to achieve the above advantages. This objective is obtained by using the method indicated in the claims. From these claims it will also be appreciated what in particular is characteristic of the invention.

Brief Description Of The Drawings

The invention will now be described in more detail, in conjunction with the accompaning drawing, which schematically shows a side view of a production plant.

Description of the Preferred Embodiments

Referring to the figure, a basically conventional plastics production plant is shown, which includes a plastics extrusion machine or extruder 1, a screen pack assembly 2, a feed pump 3, an annular die 4, a lay-flat and nip roll assembly 5, and a wind-up device 6.

Raw materials and additives A, B, C, D are fed via a funnel 7 into the extruder 1, which comprises a cylinder 8 and a rotative screw 9 therein. The screw 9 is driven by a drive motor (not shown). The screw 9 feeds the feed stock and additives A, B, C, D into the cylinder 8, which are processed there and mixed to a homogeneous melt. The screw 9 transports this melt at the same time as pressure is being built up.

During the infeed of a certain material mixture A, B, C, D with a measured amount per time unit and for a certain revolution number of the extruder screw 9, there occurs a pressure build-up P1 of the melt, at the outfeed from the extruder 1 before the screen pack assembly 2. This pressure P1 is basically maintained independant of variations of the pressure drop across the screen pack assembly 2. An increase of the pressure drop across the screen pack assembly 2 results in a smaller throughput, and if no parameters are changed, as for the extruder, the level of kinetics of extrusion will be increased, which is not desirable.

The pump 3 is set to meter out a predetermined amount of melt per time unit through the die 4. The die 4 is in the illustrative example of the kind that has an annular die gap, through which the melt is metered out, in the form of a tubular foil 10, which is stretched and kept stretched by air, which is entrapped or kept constant therein. At a distance above the die, the plastic is crystallized by cooling, preferably by supplied cooling air, and this is where the pronounced frostline or crystallization line 11 is obtained. Above or along this line 11, there is the resulting formed plastic foil 12, which is flattened and lifted from the die 4 by the nip roll assembly 5, and from there transferred to the wind-up device 6 and, if so desired, with an optional stretching of the foil 12.

By varying the throughput from the pump 3, the productive amount per time unit is changed. Similarly, it is required that the flowthrough from the screen pack assembly 2 the whole time equals the output from the pump 3. That is the reason for measuring the pressure P2 after the screen pack assembly 2 and the pressure P3 between the pump 3 and die 4. The pressure P3 prevailing before the die is the sum of P2 and the pressure build-up produced by the pump 3. If this pump therefore has a maximum pressure, which it is desirable to exceed, this can be carried out in relation to the pressure that the screen pack assembly will allow before the pump.

A factor, which can also be of importance, is the melt temperature in different parts of the extruder. Thus it is important for the temperature not, at any time, to exceed a value which would be detrimental to the final product. It is also important not to have higher melt temperature than what would be necessary for the melt to obtain the required product properties, since then an additional cooling capacity would be necessary and lead to productivity and energy losses. In addition, the melt temperature could be regarded as a measure of the level of kinetics of extrusion, since a certain processing of a certain amount of the raw material under certain circumstances gives a certain temperature.

Using the invention one can thus choose different parameters. As a measure of the level of kinetics of extrusion, it would be easier to start out with the pressure P1 before the screen pack assembly 2 in combination with a certain pressure drop across the screen pack assembly 2. Otherwise an initial parameter would have to include a combination of revolution numbers of the extruder and thereto supplied material amount per time unit, as well as supplied additional energy for i.e. heating. That initial parameter would then have to be matched with the amount of manufactured plastic product per time unit or with any other parameter.

The problem is however, as mentioned above, that the screen pack assembly 2 gradually clogs up and the pressure drop across it increases. This pressure drop is evident from the pressure P2, which is measured after the screen pack assembly 2 but before the pump 3. The pressure drop thus indicates, on the one hand, that the level of kinetics of extrusion will be increased and, on the other hand, that the output from the pump 3 may change.

The pump 3 must, as mentioned above, be supplied with a certain amount of melt per time unit to be able to maintain the predetermined production rate, and this amount has to be kept above a predetermined minimum pressure. The pressure P2, which is detected between the screen pack assembly 2 and pump 3, is in a certain relation to this amount per time unit. When therefore the pressure P2 moves closer to a predetermined minimum value, we are approaching the critical point, below which the amount of melt fed to the pump 3 becomes too little to meet the the production requirements.

In this case, the sieve in the screen pack assembly 2 has to be cleaned or exchanged, or the effective output from the die 4 has to be decreased. The last mentioned step would lead not only to a production decrease in the pump 3, but also to that the number of r.p.m.'s of the units 5 and 6 will have to be reduced. In other words, the production rate will be reduced.

To supervise the operation a pressure sensor is preferably provided also between the pump 3 and die 4.

In summary, the present invention purports that for the extrusion machine or extruder 1 there is the aim to maintain a predetermined, constant level of kinetics of extrusion, which is readily supervised and controlled by sensing the melt pressure of the extruded plastic before and after the subsequent screen pack assembly 2. The pressures P1 and P2 are therefore a suitable measure of the level of kinetics of extrusion. A special pump 3 provides for the feeding of material to the die 4, so that the latter is always supplied with a constant amount of material per time unit. In order for this pump 3 to be supplied with a sufficient amount of material per time unit at a predetermined minimum pressure, which is an absolute minimum, the pressure P2 between the screen pack assembly 2 and the pump 3 is supervised, also for this control purpose. The pressure P3 between the pump 3 and die 4 is preferably also supervised, so that we know that the die 4 is supplied with the correct amount of melt for the desired final product.

In accordance with the present invention a contained amount of plastic feed stock and/or formed product can be continuously supervised, and the supplied amount of energy can be controlled to a constant level per unit of plastic feed stock as a measure of the level of kinetics of extrusion, solely or in combination with the melt pressure between the process unit and screen pack assembly and/or melt temperature before and/or after the pump.

By the above measures, which are seemingly simple but not previously employed, the initially set up objective is achieved. The invention can be modified in various ways by those skilled in the art. Such modifications are possible without departings from the scope of the invention, as it is defined in the accompanying claims.

I claim:

1. A method of controlling the level of kinetics of extrusion and metering out of a plastic material in an extrusion process, by means of an extrusion plant comprising a process unit for melting and mixing the plastic material to form a plastic melt, a pump for metering out the melt to a die, and a screen pack assembly positioned between the process unit and the pump, comprising the steps of maintaining the plastic melt of the process unit at a constant level of kinetics of extrusion, independent of variations in raw material, in flowthrough of the screen pack assembly, and maintaining melt pressure between and screen pack assembly and the pump at a predetermined level.

2. The method of claim 1 including the further step of using plastic melt pressure between the process unit and the screen pack assembly as a measure of the level of kinetics of extrusion.

3. The method of claim 1 including the further step of using melt pressure drop across the screen pack assembly as a measure of the level of kinetics of extrusion.

4. The method of claim 1 including the further step of using melt temperature before the pump is used, as a measure of the level of kinetics of extrusion.

5. The method of claim 1 including the further step of continuously supervising a contained amount of plastic feed stock, and controlling a supplied amount of energy to a constant level per unit of plastic feed stock as a measure of the level of kinetics of extrusion.

6. A method for controlling the level of kinetics of extrusion and metering out a plastic material in an extrusion process, by means of an extrusion plant comprising a process unit for melting and mixing the plastic material to form a plastic melt, a pump for metering out the melt to a die, and a screen pack assembly positioned between the process unit and the pump, comprising the steps of maintaining the plastic melt of the process unit at a constant level of kinetics of extrusion, independent of variations in raw material, in production of plastic articles per time unit, and maintaining melt pressure between the screen pack assembly and the pump at a predetermined level.

7. The method of claim 6 including the further step of using plastic melt pressure between the process unit and the screen pack assembly as a measure of the level of kinetics of extrusion.

8. The method of claim 6 including the further step of using melt pressure drop across the screen pack assembly as a measure of the level of kinetics of extrusion.

9. The method of claim 6 including the further step of using melt temperature before the pump is used, as a measure of the level of kinetics of extrusion.

10. The method of claim 6 including the further step of continuously supervising a contained amount of plastic feed stock, and controlling a supplied amount of energy to a constant level per unit of plastic feed stock as a measure of the level of kinetics of extrusion.

11. A method for controlling the level of kinetics of extrusion and metering out of a plastic material in an extrusion process, by means of an extrusion plant comprising a process unit for melting and mixing the plastic material to form a plastic, melt, a pump for metering out the melt to a die, and a screen pack assembly positioned between the process unit and the pump, comprising the steps of maintaining the plastic melt of the process unit at a constant level of kinetics of extrusion, independent of variations in raw material, in flowthrough of the screen pack assembly and production of plastic articles per time unit, and maintaining melt pressure between the screen pack assembly and the pump at a predetermined level.

12. The method of claim 11 including the further step of using plastic melt pressure between the process unit and the screen pack assembly as a measure of the level of kinetics of extrusion.

13. The method of claim 11 including the further step of using melt pressure drop across the screen pack assembly as a measure of the level of kinetics of extrusion.

14. The method of claim 11 including the further step of using melt temperature before the pump is used, as a measure of the level of kinetics of extrusion.

15. The method of claim 11 including the further step of continuously supervising a contained amount of plastic feed stock, and controlling a supplied amount of energy to a constant level per unit of plastic feed stock as a measure of the level of kinetics of extrusion.

16. The method of claim 1 including the further step of using melt temperature after the pump is used, as a measure of the level of kinetics of extrusion.

17. The method of claim 1 including the further step of using melt temperature before and after the pump is used, as a measure of the level of kinetics of extrusion.

18. The method of claim 6 including the further step of using melt temperature before the pump is used, as a measure of the level of kinetics of extrusion.

19. The method of claim 6 including the further step of using melt temperature after the pump is used, as a measure of the level of kinetics of extrusion.

20. The method of claim 6 including the further step of using melt temperature before and after the pump is used, as a measure of the level of kinetics of extrusion.

* * * * *